Figure 7:
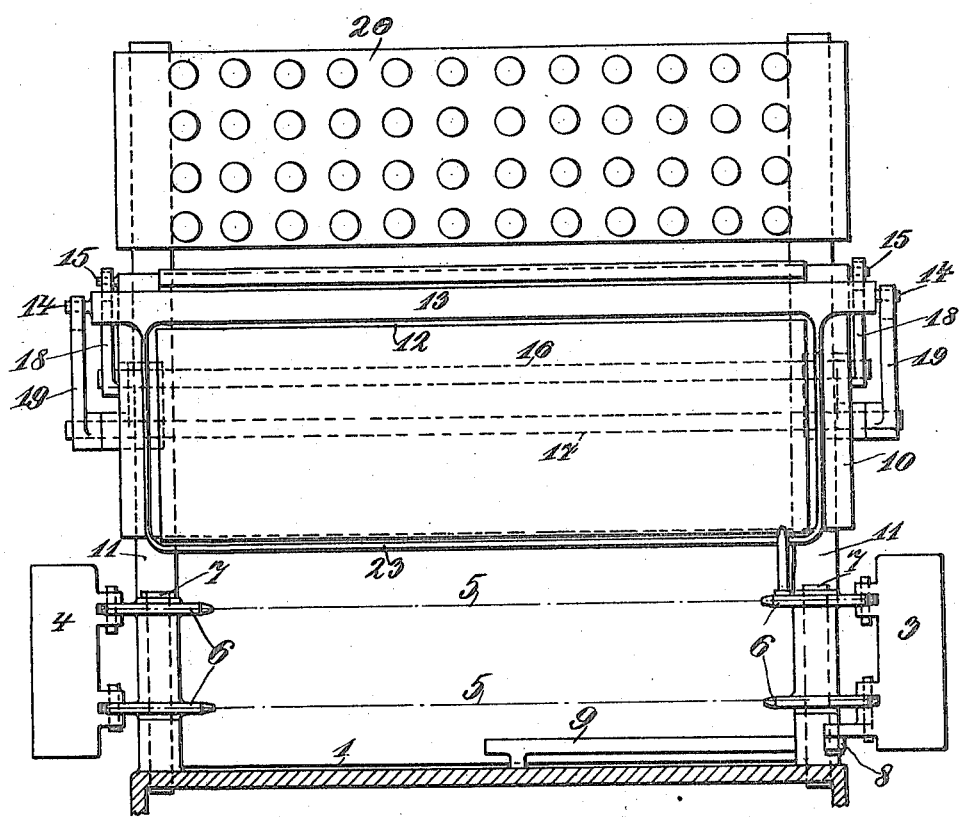

F. KÜHTZ.
CHARGING AND EMPTYING DEVICE FOR BAKING OVENS AND THE LIKE.
APPLICATION FILED AUG. 14, 1914.
1,207,181.
Patented Dec. 5, 1916.
3 SHEETS—SHEET 1.
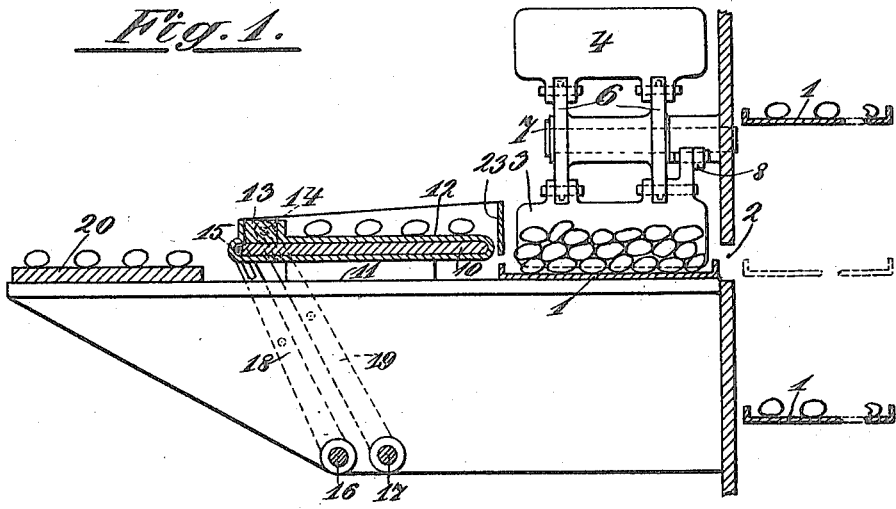
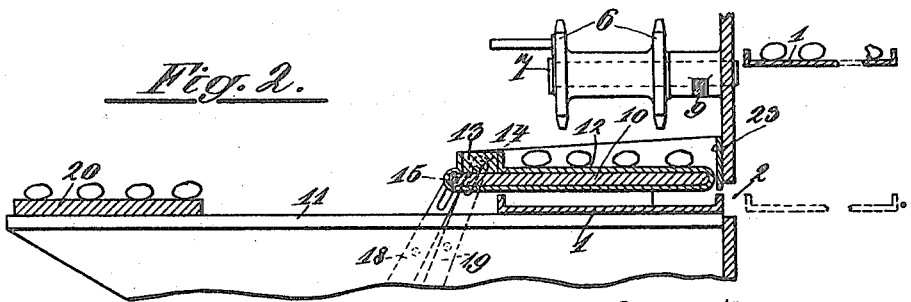
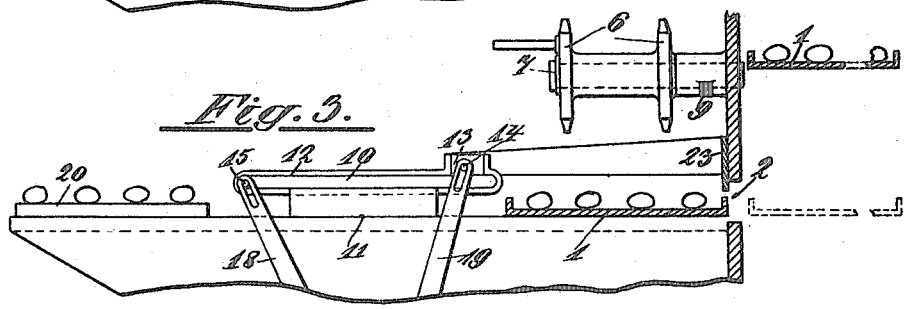
WITNESSES
Charles B Crompton
Fred H. Pohl
F. Kühtz.
INVENTOR
BY Croydon Marks
ATTORNEY

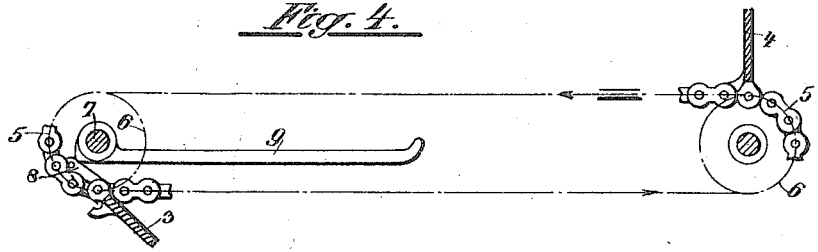
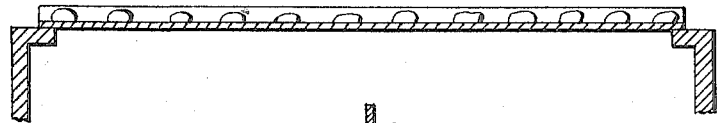
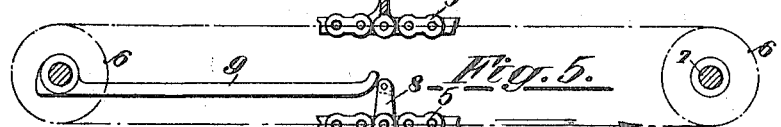
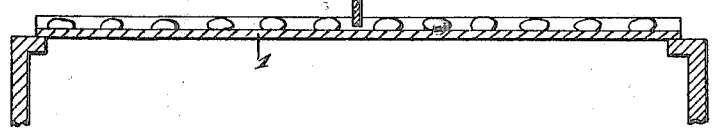
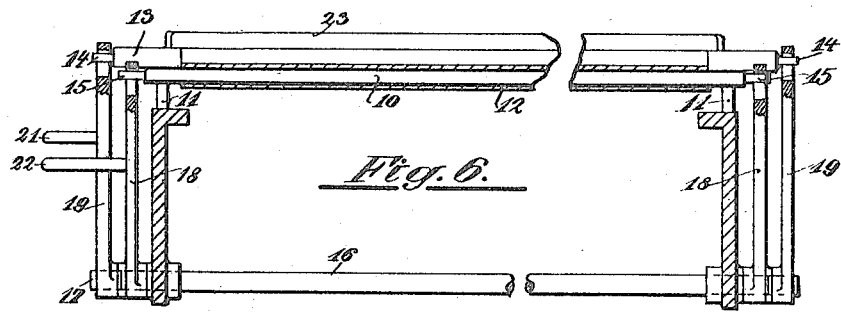

F. KÜHTZ.
CHARGING AND EMPTYING DEVICE FOR BAKING OVENS AND THE LIKE.
APPLICATION FILED AUG. 14, 1914.

1,207,181.

Patented Dec. 5, 1916.
3 SHEETS—SHEET 3.

WITNESSES
Charles B Crompton
Fred G. Pohl

F. Kühtz.
INVENTOR
BY E. Broydon Marks
ATTORNEY

UNITED STATES PATENT OFFICE.

FRIEDRICH KÜHTZ, OF STUTTGART-CANNSTATT, GERMANY.

CHARGING AND EMPTYING DEVICE FOR BAKING-OVENS AND THE LIKE.

1,207,181. Specification of Letters Patent. Patented Dec. 5, 1916.

Application filed August 14, 1914. Serial No. 856,822.

*To all whom it may concern:*

Be it known that I, FRIEDRICH KÜHTZ, a subject of the King of Wurttemberg, and residing at Teckstrasse 5, Stuttgart-Cannstatt, Germany, have invented certain new and useful Improvements in Charging and Emptying Devices for Baking-Ovens and the like, of which the following is a specification.

My invention relates to improvements in charging and emptying devices for continuous working baking ovens.

The charging and emptying of the baking trays in continuous working baking ovens in which the articles to be baked are charged and withdrawn at the same place, causes some difficulty especially with small bread rolls, on account of the short time at disposal for these operations.

The object of my invention is to remove these hitherto existing difficulties.

According to my invention the charging and emptying devices are arranged in such a manner that the charging of the baking trays emerging from the oven in the lateral direction is effected in the transverse direction of same whereas the emptying of said trays is effected in the longitudinal direction, thus greatly economizing time and space.

One form of construction of the invention is shown by way of example in the accompanying drawings in which:—

Figures 1, 2 and 3 show the device in various positions, in cross section, Figs. 4 and 5 show two positions of the emptying apparatus in longitudinal section, Fig. 6 shows the charging apparatus in longitudinal section and Fig. 7 shows a plan of the whole apparatus.

The baking trays 1 come in sequence out of the dotted position at 2 out of the oven and remain a short time in this position for the purpose of being emptied and recharged. Two plates 3 and 4 serve for emptying the trays and are secured to endless chains 5 which run over the chain wheels 6 mounted on pivots 7.

The plates 3 and 4 are arranged in such a manner that they pass with their lower edge close above the withdrawn baking tray 1, in its longitudinal direction. Plate 3 is suspended movably to the chain 5 and provided with a guiding roller 8 which is controlled by a corresponding guide 9 in such a manner that in the position shown in Fig. 4 the plate 3 is rotated upwardly so that it passes with its upper edge above the baked rolls.

As soon as the plate 3 has moved in the direction of the arrow and reached the center of the baking tray 1 (Fig. 5), the roller 8 is released from the guide 9 and the plate 3 then drops, so that on its further movement it pushes in front of it the baked rolls and thus empties one half of the baking tray. Plate 4 then likewise comes into position above the baking tray 1 and then, as it is rigidly secured to the chain 5, pushes the second half of the rolls in front of it, whereby the second half of the baking tray is emptied. By thus removing the baked rolls in two separate operations the danger of crushing or otherwise mutilating them is avoided.

The charging is effected in a known manner by the plate 10 which slides at both ends at 11 over the front frame of the oven, preferably by means of rollers. Above said plate 10 there is movably arranged a band 12 which is secured at both ends to the sliding piece 13. This sliding piece 13 is provided at each end with a pin 14 and the plate 10 likewise possesses at each end a pin 15. Below this plate 10 and mounted for example in the front frame of the oven, there are situated two spindles 16 and 17 on each of which are secured two levers 18 and 19. The two levers 18 secured to the spindle 16 engage the pins 15 of the plates 10 by means of slots or joints whereas the two levers 19 secured to the spindle 17 engage in a similar manner the pin 14 of the sliding piece 13.

The pieces of dough to be baked are brought to the oven on leavening boards 20 which are laid on the front frame of the oven, whereupon the pieces of dough are removed from the leavening board to the cloth 12 by hand when this latter is in the position shown in Fig. 1.

As soon as the baking tray 1 has been emptied by the apparatus above described and when the two plates 3 and 4 at both ends of the baking tray are horizontal (Fig. 7) and the cloth 12 is covered to a surface corresponding to the size of the baking tray, the levers 18 and 19 are pressed by means of the handles 21, 22 or the like toward the oven, thus pushing the plate 10 with the cloth 12 and the sliding piece 13 until above the baking tray in the position shown in Fig. 2. The lever 19 is then held fast by means of the handle 21 and the lever 18 is pulled back quickly by means of the handle 22 into the position shown in Fig. 2. The plate 10 hereby returns into its original position while the cloth 12 is held by the sliding piece 13.

The pieces of dough which previously lay on the cloth 12 above the baking tray 1 are now laid in similar position and similarly distributed on the baking tray 1. The sliding piece 13 is thereupon drawn back into the position according to Fig. 1 by means of the levers 19 and handles 21 and the band 12 can again be filled from the next leavening board.

In connection with the sliding piece 13 there is provided a piece of sheet metal, wood or the like 23 which, in the positions according to Figs. 2 and 3 lies against the oven wall and in the position according to Figs. 1 and 7 is situated at the outer edge of the baking tray 1 in such a manner that it forms a trough with the outer wall of the oven, which trough contains the baked rolls on the same being pushed off the baking plate 1 and prevents said rolls from falling on the band 12.

This combination of the charging and emptying device and the transposition of the charging process to different sides and in different directions renders it possible to effect the charging of the baking tray in a few seconds and thus attain a large working capacity of the oven. The necessary time for feeding the cloth 12 from the leavening board 20 is obtained during the period of reversal of the baking tray 1 and while same is being emptied.

The movements of the charging and emptying devices may, instead of by hand, be equally well effected mechanically in the correct sequence by the mechanical actuating apparatus of the baking tray, so that the only manual operation is that of feeding the cloth 12 with pieces of dough from the leavening board 20. This operation may however also be effected by mechanical means.

Instead of using chains 5, ropes, belts, or the like may be employed. It is also contemplated to employ a single chain instead of the pair of chains, and in place of only one swinging plate 3 a plurality of such plates may be used.

What I claim is:—

1. The combination with a baking oven adapted to receive trays and having supporting means for said trays, of a reciprocable carrier for charging the trays, and an endless carrier for discharging said trays, said carriers being operable transversely and longitudinally respectively of the trays, substantially as described.

2. The combination with a baking oven adapted to receive trays and having supporting means for said trays, of apparatus for charging the trays comprising a suitable frame, a reciprocable plate mounted on the frame, a flexible covering on said plate adapted to have the articles to be baked deposited thereon, and levers for actuating said plate and covering respectively, said levers adapted to be operated together to move said plate and covering to carry the articles to a position above the tray, said plate levers then adapted to be operated to move the plate relatively to the covering whereby to deposit the articles in position on the tray, and said covering levers adapted to be operated to move the covering relatively to the plate to restore the parts to receive another charge for the oven tray, substantially as described.

3. The combination with a baking oven adapted to receive trays and having supporting means for said trays, of apparatus for discharging the trays comprising an endless flexible member adapted to travel, a pivotally mounted plate carried by said member adapted to remove articles from a portion of the tray during its travel thereover, a cam track fixed adjacent the path of said plate and arranged to hold the plate out of operative position with relation to the tray during its travel over a second portion of the tray, and a second plate rigidly mounted on said endless carrier adapted to remove the articles from the remaining portion of the tray, substantially as described.

4. The combination with a baking oven adapted to receive trays and having supporting means for said trays, of apparatus for discharging the trays comprising an endless flexible member adapted to travel, a pivotally mounted plate carried by said member, a track adapted to engage with said pivotally mounted plate and hold the same inactive during a part of its travel and then release the same to remove articles from a portion of the tray, and a second plate rigidly mounted on said endless carrier adapted to remove the articles from the remaining portion of the tray, substantially as described.

In testimony whereof I have signed my name to this specification in the presence of two subscribing witnesses.

FRIEDRICH KÜHTZ.

Witnesses:
  RIDA KLARBER,
  ROSA THALBAUER.

Copies of this patent may be obtained for five cents each, by addressing the "Commissioner of Patents, Washington, D. C."